Nov. 9, 1965 T. E. WRIGHT ETAL 3,216,578
PLEATED FILTER
Filed Dec. 19, 1960 2 Sheets-Sheet 1

INVENTOR.
THERON E. WRIGHT
LAWRENCE H. MUSCHAMP
BY
Merchant & Merchant
ATTORNEYS Nov. 9, 1965 T. E. WRIGHT ETAL 3,216,578
PLEATED FILTER
Filed Dec. 19, 1960 2 Sheets-Sheet 2
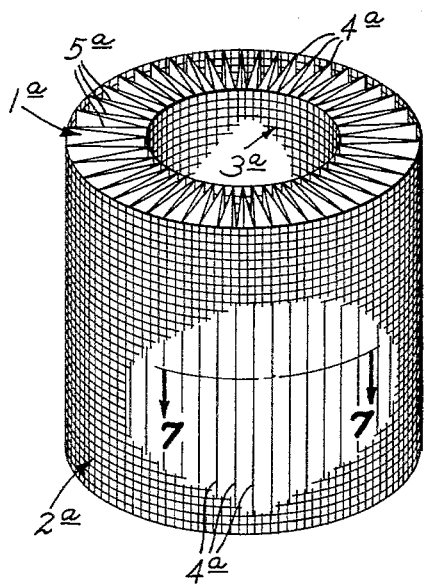
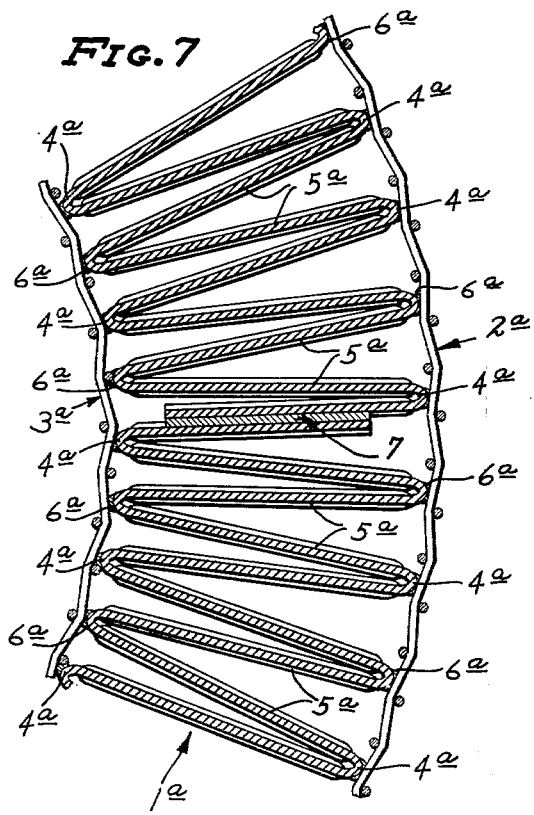
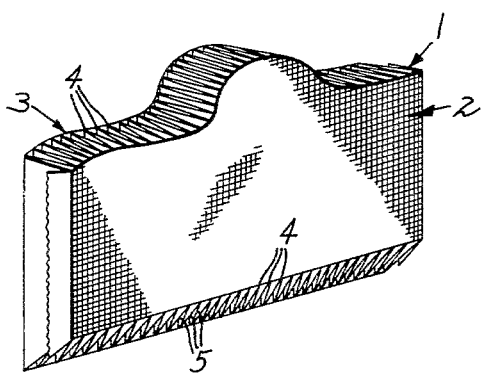
INVENTOR.
THERON E. WRIGHT
LAWRENCE H. MUSCHAMP
BY
Merchant & Merchant
ATTORNEYS United States Patent Office 3,216,578
Patented Nov. 9, 1965

3,216,578
PLEATED FILTER
Theron E. Wright and Lawrence H. Muschamp, Minneapolis, Minn., assignors to Donaldson Company, Inc., St. Paul, Minn., a corporation of Delaware
Filed Dec. 19, 1960, Ser. No. 76,555
4 Claims. (Cl. 210—484)

Generally stated, our present invention relates to improvements in filters for gaseous and liquid fluid mediums. More particularly, the instant invention relates to improvements in filters of the kind or variety comprising a filter element or self-sustaining sheet filter material formed to provide a series of generally V-shaped pleats having relatively sharp edges defining the leading (or front) and trailing (or rear) sides of the filter element. Such pleated filter elements may be of various different materials having suitable porosity and rigidity, but at the present state of the art are generally of uncalendered, resin treated, filter paper. In a still more specific sense it may be said that the instant invention relates to improvements in filter units comprising pleated filter elements embraced at one or both of its opposite sides, defined by the edges of the pleats, by a relatively rigid screen of much greater porosity than the pleated filter element.

Filters of the above described variety have a wide range of applications for removing foreign substances from liquid and gaseous fluid mediums. As typical examples, such filters are very commonly used in the automotive and aeronautical industries in connection with the air intake systems of internal combustion engines of the piston and jet types and in connection with the oil lubricating systems of such engines.

An important object of the instant invention is the provision, in pleated filters of the above described character, of means whereby the useful life of the pleated filter elements are greatly extended.

Another important object of the instant invention is the provision of means whereby the efficiency of pleated filters of the above described character is greatly increased.

A still further object of the instant invention is the provision of filter units of the above described character having greatly increased efficiency and increased useful life, as compared to prior art filters of the same general character.

In accordance with the instant invention the useful and efficient operating lives of pleated filter elements of the above described character are greatly extended by capping the relatively sharp edges of the pleats with a plastic material that is highly resistant to abrasion by foreign solid substances, and the like, carried by the fluid medium passed through the pleated filter. In some cases it may be sufficient to provide such a protective capping only over the edges of the pleats defining the leading or frontal side of the filter element, but in many, and perhaps most instances, it will be found desirable and advantageous to thus cap the edges of the pleats defining both the leading and trailing sides of the filter element, and this particularly when the pleated filter element has been formed by sharp bending or folding of flat sheet material. In the latter case the material is generally weakened by folding and the said capping serves to greatly strengthen these weakened areas. Also, for example, when filters are to be used in connection with air intake systems of internal combustion engines which are subject to occasional backfire of hot combustion gases through their intake systems, it is desirable to cap also the sharp pleat edges defining the trailing or rear side of the filter element in order to protect these highly vulnerable trailing pleat edges against the deteriorating affects of the hot backfire gases. In this connection it has been frequently noted that such hot backfire gases often scorch the unprotected sharp pleat edges of prior art pleated filter elements, thereby greatly reducing the useful life thereof. However, the pleat edge capping provided in accordance with the instant invention is highly resistive to the affect of instantaneous hot backfire gases and generally prevents damage thereby to the sharp edges of the pleats. In practice it has been found that the sharp edges of the pleats are much more vulnerable to damage by instantaneous backfire gases and abrasion by foreign substances than are the filter surfaces connected by said edges, so that capping of these sharp edges alone will greatly extend the life of the pleated filter element without appreciably diminishing the useful air-pervious filter areas thereof.

As previously indicated, pleated filter units comprising pleated filter elements of self-sustaining sheet material, often comprise a screen embracing one or both of the leading and trailing sides of the pleated filter element. In accordance with known prior art practice no means is provided for positively anchoring the edges of the pleats to the adjacent screen or screens, such as to maintain a positive predetermined spacing between the pleat edges, and as a result of which, lack of positive anchorage of the pleats to the screens, the pleats tend to open and close under pulsating or irregular fluid pressures, sometimes to the extent of completely closing some pleats while opening others. This shifting of the pleats in prior art filters is highly objectionable first, because it shortens the life of the filter element due to flexing of the sharp edges of the pleats and frictional rubbing contact with the screen or screens; and secondly, because the operating efficiency of the pleated filter unit is reduced by the above noted distortion of the filter element, particularly when some of the pleats are closed or nearly closed.

In accordance with the invention the last above noted and other objectionable characteristics of the prior art pleated filters are largely or wholly overcome by adhesively bonding the edges of the pleats to an adjacent screen or screens, so as to positively prevent distortion of the pleated filter element under varying fluid pressures and thereby maintain a pre-arranged uniform spacing between pleat edges. In some cases it will be found satisfactory to bond only the pleat edges at one side of the filter to a screen, but in preferred practice of the invention the edges of the pleats at both sides of the pleated filter element will be thus bonded to a suitable screen.

In accordance with preferred practice we apply a protective capping over the sharp pleat edges from end to end of each thereof and utilize this capping as a bonding medium between the pleat edges and an adjacent screen or screens, whereby to protect the pleat edges against deteriorating effects resulting from abrasion, heat or the like, and positively anchor the pleated filter element against flexing and distortion as above noted. For this compound purpose we utilize, as a combined protective capping and bonding agent, an initial liquid plastic adhesive which, upon setting, provides the desired pleat edge protection and bonding medium between the pleat edges and screen or screens.

The above and other important objects and advantages of the invention will be made apparent or emphasized in the following specification, claims and appended drawings.

In the accompanying drawings, like characters indicate like parts throughout the several views.

Referring to the drawings:

FIG. 5 is a perspective view of a panel-type filter unit of the general character illustrated in FIG. 1 but showing that such a unit may be post-formed to provide irregular shapes;

FIG. 6 is a perspective view, with some parts broken away, of a cylindrical type filter unit embodying the invention; and FIG. 7 is a fragmentary sectional view, on a greatly enlarged scale, taken on the line 7—7 of FIG. 6.

Description of FIGS. 1–4

Figure 1:
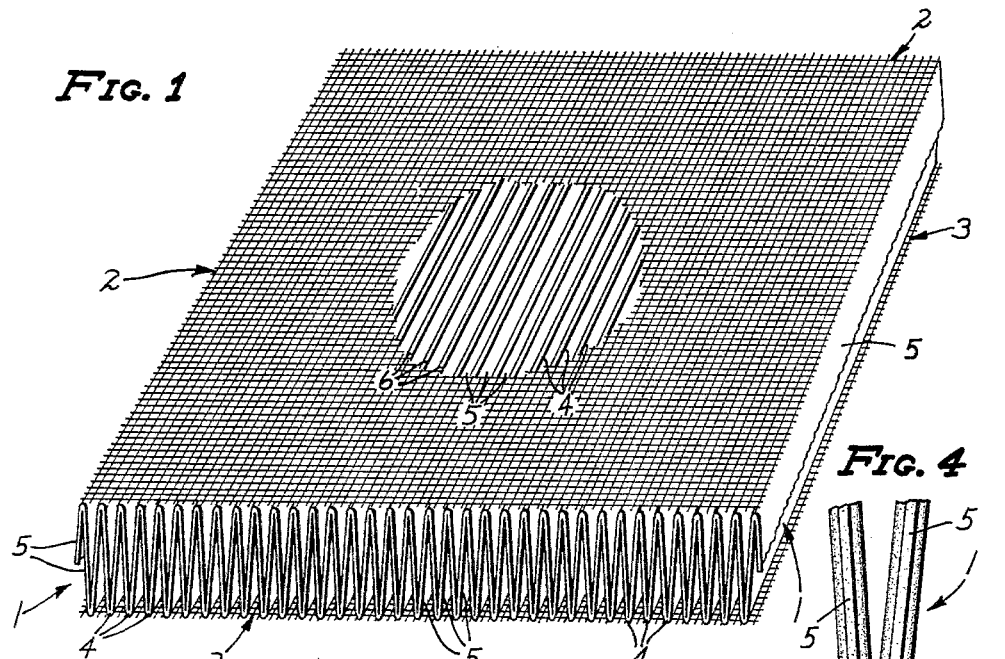
FIG. 1 is a perspective view, with some parts broken away, of a preferred form of a panel-type filter unit made in accordance with the invention.
Figure 4:
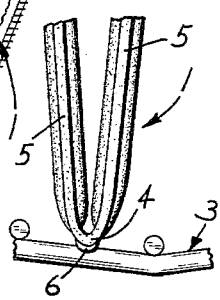
FIG. 4 is a fragmentary view, on a still further enlarged scale, showing a portion of FIG. 2 in end elevation.
Figure 2:
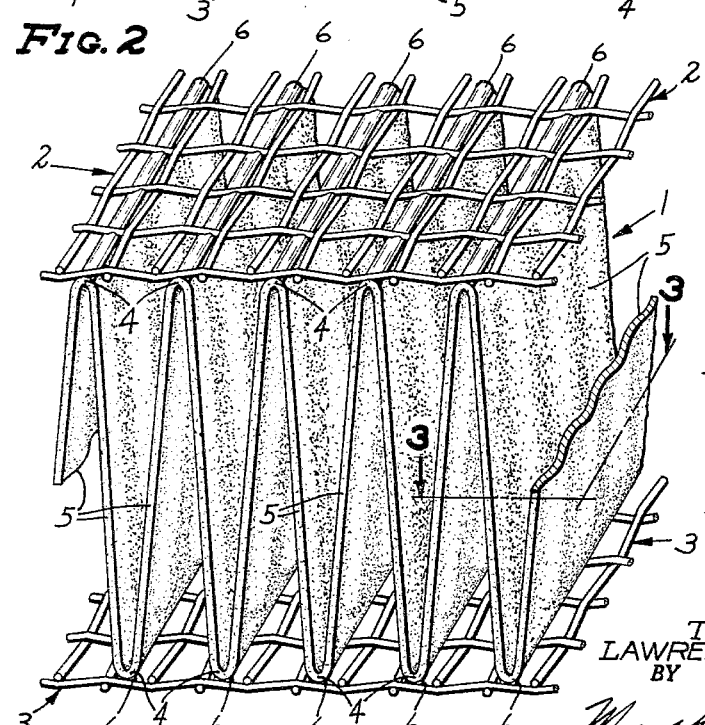
FIG. 2 is a fragmentary perspective view, on a greatly enlarged scale, of a portion of FIG. 1.
Figure 3:
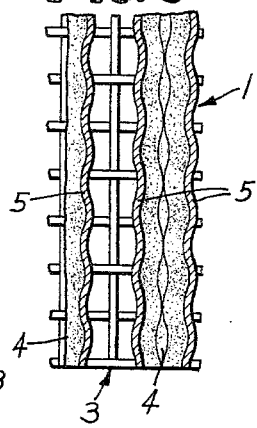
FIG. 3 is a fragmentary sectional view taken on the line 3—3 of FIG. 2.

In these FIGURES 1–4 we illustrate a preferred form of panel-type filter unit made in accordance with the invention. This filter unit comprises a pleated filter element indicated as an entirety by 1, a screen 2 embracing and applied to and embracing the other side of the pleated filter element 1. The pleated filter element 1 is formed of self-sustaining sheet filter material having suitable porosity and rigidity for its intended purpose. Preferably, and for the purpose hereof, the pleated filter element is formed of uncalendered, resin treated, paper of a kind well known in the art as it pertains particularly to filter elements used in air and oil filter units, for example. The filter element 1 is formed to define a series of generally identical pleats of generally V-shape comprising relatively sharp edges 4 connected by relatively flat panel-like filter faces 5. In accordance with usual and preferred practice the pleated filter element 1 is pleated by folding a long strip of this resin treated filter paper, or equivalent material, to provide the said series of generally identical V-shaped pleats. This sheet material, from which the pleated filter is formed by folding, may be and is shown as being longitudinally corrugated to increase its rigidity and this is best shown in FIGS. 3 and 4; all attempts to show such corrugation of the material having been omitted in other of said FIGS. 1–4.

The screens 2 and 3 may be of any suitable material or configuration having suitable rigidity and porosity. However, for the purpose hereof, the screens 2 and 3 may be assumed to be of woven metallic wire having much greater porosity than the pleated filter element 1 and having much greater rigidity than said filter element.

As pictured in FIG. 1, the panel filter is not distinguishable from prior art panel filters also comprising a pleated filter element embraced on opposite sides by screens overlying the adjacent pleat edges. However, as will be seen by reference to detail views 2 and 4, the filter panel disclosed in FIGS. 1–4 is a rigid unitary structure comprising the pleated filter element 1 and the screens 2 and 3 by virtue of the fact that, as previously indicated, said screens are securely bonded to the edges of the filter element pleats to form an integral unit without dependence upon the usual peripheral frame structure, not shown. Preferably, and as disclosed in these figures, the relatively sharp edges 4 of the pleats are protected against abrasion, instantaneous heat and the like, by a capping of plastic material which extends substantially from end to end at each pleat edge 4 and serves also as an adhesive bonding medium for positively anchoring the screens 2 and 3 to their respective pleat edges 4. This combined protective capping and screen bonding adhesive, indicated by 6 in FIGS. 2 and 4, is applied in a liquid state to the edges of the pleats and thereafter sets or hardens to provide the desired protection against abrasion, heat and the like and bonding of the screens to the edges of the pleated filter. A material found highly satisfactory for this purpose is "Resiweld" epoxy adhesive obtainable from H. B. Fuller Company of St. Paul, Minnesota, or equivalent, formulated as follows, to wit: Nu144–52–38 epoxy compound or equivalent.

Mix three parts "Part A" (grey resin) to one part "Part B" (creme hardener) by weight. This material may be applied to the edges of the pleats in any suitable manner, such as by dipping or by paint roller preferably from the under side. As applied, this material is in a thick slow-running fluid state such as to allow it to be partially absorbed into the porous filter material and to build up a body of material over the surface of the filter pleat edges. The screens 2 and 3 are applied to the edges of the pleats while the capping 6 of adhesive is still in a liquid state so that the screens become partially embedded in the capping material and become firmly and positively anchored thereto and to the pleat edges upon setting or hardening of the adhesive capping 6, thereby uniting the pleated filter element 1 and screens 2 and 3 into an integral unit.

As previously indicated, this edge capping 6 greatly extends the life of a pleated filter even when employed independently of an associated screen or screens. However, as also previously indicated, the useful lives of such pleated filter elements and the efficiency thereof is further greatly enhanced by bonding the screen or screens 2 or 3 to one or both of the opposite sides of the filter.

It should be understood that, whereas the filter panel of FIG. 1 is illustrated as being substantially flat it can, and sometimes will be, of curved or irregular shape from left to right with respect to FIG. 1 and still comprise a filter panel. As previously indicated, the filter panel of FIG. 1 will usually be placed in a peripheral frame to which the peripheral edges of the panel will be secured against movement and air leakage by means of a suitable adhesive which may be the same adhesive as is used to provide the protective capping 6 on the edges of the pleats and to secure said pleat edges to their respective cooperating screens 2 or 3. With further respect to the filter panels of FIGS. 1–4, it should be understood that the side of the filter that becomes the leading or front side and the side thereof which becomes the rear or trailing side will be determined by the orientation of the filter with respect to the direction of fluid flow. In other words, the side of the filter panel unit or filter element opposing the direction of fluid flow will be the front or leading side and the side of the filter facing in the direction of fluid flow will be the rear or trailing side.

Description of FIG. 5

The filter panel of FIGS. 1–4, being a rigid unitary structure, may be post-formed to provide various irregular shapes adapting it for special applications. In practice this post-forming can usually be best accomplished by cutting the same to the desired shape in a band-saw or equivalent. FIG. 5 is incorporated merely for the purpose of illustrating a filter panel of the character described in connection with FIGS. 1–4 which has been cut to a peculiar irregular shape by means such as a band-saw. Since all of the parts of the panel of FIG. 5 correspond to parts described in connection with FIGS. 1–4, they are indicated by like characters.

Description of FIGS. 6 and 7

These FIGURES 6 and 7 illustrate a cylindrical or annular filter unit made in accordance with the invention and in these figures parts corresponding to parts or elements in FIGS. 1–5 are indicated by corresponding characters plus the exponent (*a*). Cylindrical or annular filters of the variety shown in these figures are well known in the art and are, in fact, very common in the automotive industry where they are interposed in the air intake systems of internal combustion engines.

The preferred procedure for producing the cylindrical or annular type filter unit of these FIGURES 6 and 7 is substantially as follows: The inside screen 3*a* is preformed into tubular shape usually from flat screening bent into cylindrical shape with its ends brought together and permanently secured together by suitable means which, in the case of metallic screening, may be spot welding, solder or the like. Next, the pleated filter element 1a will have the edges 4a of its pleats capped at 6a with a suitable edge protecting a bonding agent which may be an epoxy resin adhesive as described in connection with FIGS. 1–4. Usually the capping 6a will be applied while the filter 1a is in a flat condition, as shown in FIG. 1. Next, and while the adhesive capping material is still in a fluid state, the pleated filter element 1a is wrapped around the cylindrical inside screen 3a and its free ends are brought together and permanently attached by a suitable means which may be the epoxy resin adhesive used to provide the capping 6a; the said joint between the adjacent ends of the now annular pleated filter element 1a being shown at 7 in FIG. 7. Next, and finally, the outside screen 2a, which may be in flat form as shown at 3 in FIG. 1, or in split cylindrical form, not shown, will be wrapped around the outside of the pleated filter element 1a to snugly embrace the adjacent capped edges 4a of the pleated filter element after which the opposite ends of the screen 2a will be permanently joined by suitable means which, in the case of metallic screen may be solder. Since the screens 2a and 3a are both brought into snug contact with their respective edges of the pleated filter element while the adhesive capping material 6a is in a fluid condition, the screens 2a and 3a will become permanently bonded to their respectively engaged pleat edges upon setting of the adhesive. Hence, just as in the structure of FIGS. 1–4, we have in the structure of FIGS. 6 and 7 a unitary structure upon setting of the adhesive which comprises the inner and outer screens and the interposed pleated filter element 1a. Obviously also, just as in the structure of FIG. 1, the unitary structure is very rigid and the pleats of the filter element are positively anchored against movement with respect to the screens so that the pre-arranged spacing of the edges of the pleats is maintained under all normal operating conditions.

It has also been found that certain plastisols can be employed to provide a suitable protective capping and adhesive for the pleat edges as illustrated at 6 in the drawings; one such plastisol being a commercially available material marketed under the trade name "Reynosol" #R–343 by Reynolds Chemical Products Company, Whitmore Lake, Michigan.

What we claim is:

1. A filter element comprising a self sustaining fluid pervious sheet material having a plurality of corrugations and having folds to provide a plurality of V-shaped pleats, adhesive means positioned along the entire outer length of each of said folds forming a protective cap therefor, and a grid structure imbedded in said adhesive means and secured by said adhesive means to predetermined one of said folds, said grid having greater porosity and being more rigid than said sheet material, said corrugations extending normal to said folds.

2. A device as in claim 1, wherein each cap is of a plastic material.

3. A device as in claim 2 wherein the plastic material is an epoxy resin.

4. A device as in claim 2 wherein the plastic material is a plastisol.

References Cited by the Examiner

UNITED STATES PATENTS

| 2,122,111 | 6/38 | Poelman et al. | 210—493 X |
| 2,326,967 | 8/43 | Poelman | 210—493 X |
| 2,395,449 | 2/46 | Briggs | 210—493 X |
| 2,423,741 | 7/47 | Vokes et al. | 55—500 X |
| 2,569,243 | 9/51 | Kovacs | 210—493 X |
| 2,749,265 | 6/56 | Fricke | 210—493 X |
| 2,895,174 | 7/59 | Hockett | 210—493 |

FOREIGN PATENTS 823,648  11/59  Great Britain.

OTHER REFERENCES

The Condensed Chemical Dictionary, Fifth Edition, Reinhold Publishing Corp., New York (1956), pp. 436 and 806.

REUBEN FRIEDMAN, *Primary Examiner.*

GEORGE D. MITCHELL, HERBERT L. MARTIN, CARL KRAFFT, *Examiners.*

UNITED STATES PATENT OFFICE
CERTIFICATE OF CORRECTION

Patent No. 3,216,578            November 9, 1965

Theron E. Wright et al.

It is hereby certified that error appears in the above numbered patent requiring correction and that the said Letters Patent should read as corrected below.

Column 6, line 11, for "one" read -- ones --.

Signed and sealed this 23rd day of August 1966.

(SEAL)
Attest:

ERNEST W. SWIDER            EDWARD J. BRENNER
Attesting Officer            Commissioner of Patents